(12) United States Patent
Bordini

(10) Patent No.: US 7,854,483 B2
(45) Date of Patent: Dec. 21, 2010

(54) TRACK FOR CRAWLER VEHICLES

(75) Inventor: Giorgio Bordini, Modena (IT)

(73) Assignee: CNH America LLC, New Holland, PA (US)

( * ) Notice: Subject to any disclaimer, the term of this patent is extended or adjusted under 35 U.S.C. 154(b) by 133 days.

(21) Appl. No.: 12/209,650

(22) Filed: Sep. 12, 2008

(65) Prior Publication Data

US 2009/0072618 A1 Mar. 19, 2009

(30) Foreign Application Priority Data

Sep. 13, 2007 (EP) .................................. 07425568

(51) Int. Cl.
*B62D 55/26* (2006.01)
(52) U.S. Cl. ....................................... 305/201; 305/185
(58) Field of Classification Search ................ 305/160, 305/185, 187, 196, 198, 200, 201, 51, 111, 305/114, 158, 159, 189; 152/182; D12/7, D12/512, 544, 579; 440/12.56, 12.63, 12.64, 440/95, 96, 97
See application file for complete search history.

(56) References Cited

U.S. PATENT DOCUMENTS

| | | | |
|---|---|---|---|
| 2,764,211 A * | 9/1956 | Armington | .................. 152/182 |
| 3,477,768 A * | 11/1969 | Culver | ......................... 305/191 |
| 3,857,617 A | 12/1974 | Grawey | |
| 4,043,610 A * | 8/1977 | Halmosi et al. | ................ 305/19 |
| 4,865,400 A * | 9/1989 | Caron et al. | ................. 305/114 |
| 5,056,306 A * | 10/1991 | Zepf | ............................. 59/84 |
| 5,261,733 A * | 11/1993 | Hara | ........................... 305/46 |
| 5,713,645 A * | 2/1998 | Thompson et al. | .......... 305/168 |
| D407,674 S * | 4/1999 | Kasai | ......................... D12/544 |
| 5,894,900 A * | 4/1999 | Yamamoto et al. | ......... 180/9.36 |
| D411,150 S * | 6/1999 | Rooney | ...................... D12/544 |
| 6,352,320 B1 * | 3/2002 | Bonko et al. | ................. 305/178 |
| 7,066,562 B2 * | 6/2006 | Rasmussen | ................. 305/191 |

FOREIGN PATENT DOCUMENTS

| | | |
|---|---|---|
| DE | 76 20 854 | 9/1977 |
| EP | 0654398 | 3/2000 |
| GB | 1416602 | 12/1975 |
| JP | 2001310776 A * | 11/2001 |
| WO | WO 89/09105 | 10/1989 |

* cited by examiner

*Primary Examiner*—S. Joseph Morano
*Assistant Examiner*—Kip T Kotter
(74) *Attorney, Agent, or Firm*—Patrick M. Sheldrake; Michael G. Harms

(57) ABSTRACT

A metal track for crawler vehicles, the track having a metal chain hinged with substantially rectangular metal shoes, each of which has a work surface with arrow-shaped teeth defined by a front portion of one arrow-shaped tooth and a rear portion of another arrow-shaped tooth spaced apart on the work surface and complementary in shape; each portion of arrow-shaped tooth cooperating with a complementary portion on a respective adjacent shoe to define a complete arrow-shaped tooth.

25 Claims, 5 Drawing Sheets

TRACK FOR CRAWLER VEHICLES

FIELD OF THE INVENTION

The present invention relates to a track for crawler vehicles.

BACKGROUND

A commonly used track for a crawler vehicle is shown in U.S. Pat. No. 3,857,617, in which the shoes are preferably made of elastomeric material, and are supported and connected to one another by a belt of internally reinforced elastomeric material, the elastic reactions of which keep the shoes packed together, even when rotating with respect to one another on engaging the track sprocket and idler wheels, so that, at any point in their travel, the shoes define a succession of continuous arrow-shaped teeth equally spaced along the longitudinal axis and defining continuous arrow-shaped channels in between.

The known track described above is designed to embody the same properties as a V-ribbed agricultural tyre. That is: a low noise level, by virtue of the arrow-shaped teeth gradually contacting the ground, as opposed to the "hammering" effect of a track with conventional shoes with teeth crosswise to the travelling direction; and a marked improvement in detachment and expulsion of clods, which, as is known, when compacted inside the arrow-shaped channels as the arrow-shaped teeth travel over the terrain, may form into a layer clinging firmly to, and so seriously impairing traction of, the track.

In a V-ribbed agricultural tyre, clod expulsion is promoted by the lateral outlets of the arrow-shaped channels, and by elastic deformation of each arrow-shaped channel as it lifts off the tyre-ground contact patch. In the same way, clod expulsion of the track described in U.S. Pat. No. 3,857,617 is promoted by the lateral outlets of the arrow-shaped channels, by elastic deformation of each arrow-shaped channel, caused by elastic deformation of the belt, at the end of the straight portion of track contacting the terrain, and by the shoes rotating with respect to one another along a jagged line about the sprocket and idler wheels.

Experience, however, shows that, clods are not always expelled from the arrow-shaped channels as the flat-running channels round a curved portion of the track, but are substantially always expelled when fractured crosswise inside the channels as the channels round the curve portion.

Unsuccessful crosswise fracturing of the clods has been found to be caused by elastic deformation of the channels generating evenly distributed stress in the clods, which often fails to fracture the clods crosswise. Especially in U.S. Pat. No. 3,857,617 only a small angle $\theta$ will become available between the two succeeding shoes to accommodate the change from a generally flat belt configuration to a circular belt configuration as the shoes pass through the footprint. The deflection of the elastomeric shoes through the small angle $\theta$ is not sufficient to fracture the clods and to allow them to be removed out of the arrow-shaped channels.

SUMMARY OF THE INVENTION

The present invention provides improved crosswise fracture of clods lodged inside the arrow-shaped channels, as the channels round a portion of the track. The invention can be used in conjunction with a track for crawler vehicles wherein the track has multiple shoes, and an endless drive member connecting the shoes to one another so that a first and second edge, crosswise to the longitudinal axis, of each shoe are adjacent to the second and first edge, respectively, of adjacent shoes. Each shoe has a work surface with arrow-shaped teeth, which has a front portion of one arrow-shaped tooth and a rear portion of another arrow-shaped tooth spaced apart on the work surface and complementary in shape. Each portion of the arrow-shaped tooth of each shoe cooperates with a relative complementary portion on a respective adjacent shoe to define a complete arrow-shaped tooth. The complementary front and rear portions of each complete arrow-shaped tooth are located a first distance apart, measured along the longitudinal axis, to define a gap.

Accordingly, as opposed to evenly distributed elastic elongation, the flat-running arrow-shaped channels, on rounding a curved portion of the track, in addition to the already available gap in between the parts of the arrow-shaped tooth, undergo a concentrated elongation produced by each shoe parting from the adjacent shoes, and which invariably produces sufficient stress in the clods to ensure crosswise fracturing.

The gap is configured to provide for bridging and transmitting stress between the clod portions on each shoe, so that dislodging and expulsion of one clod portion automatically also dislodges and expels the clod portion connected to it.

BRIEF DESCRIPTION OF THE DRAWINGS

A number of non-limiting embodiments of the present invention will be described by way of example with reference to the accompanying drawings, in which.

Figure 1:
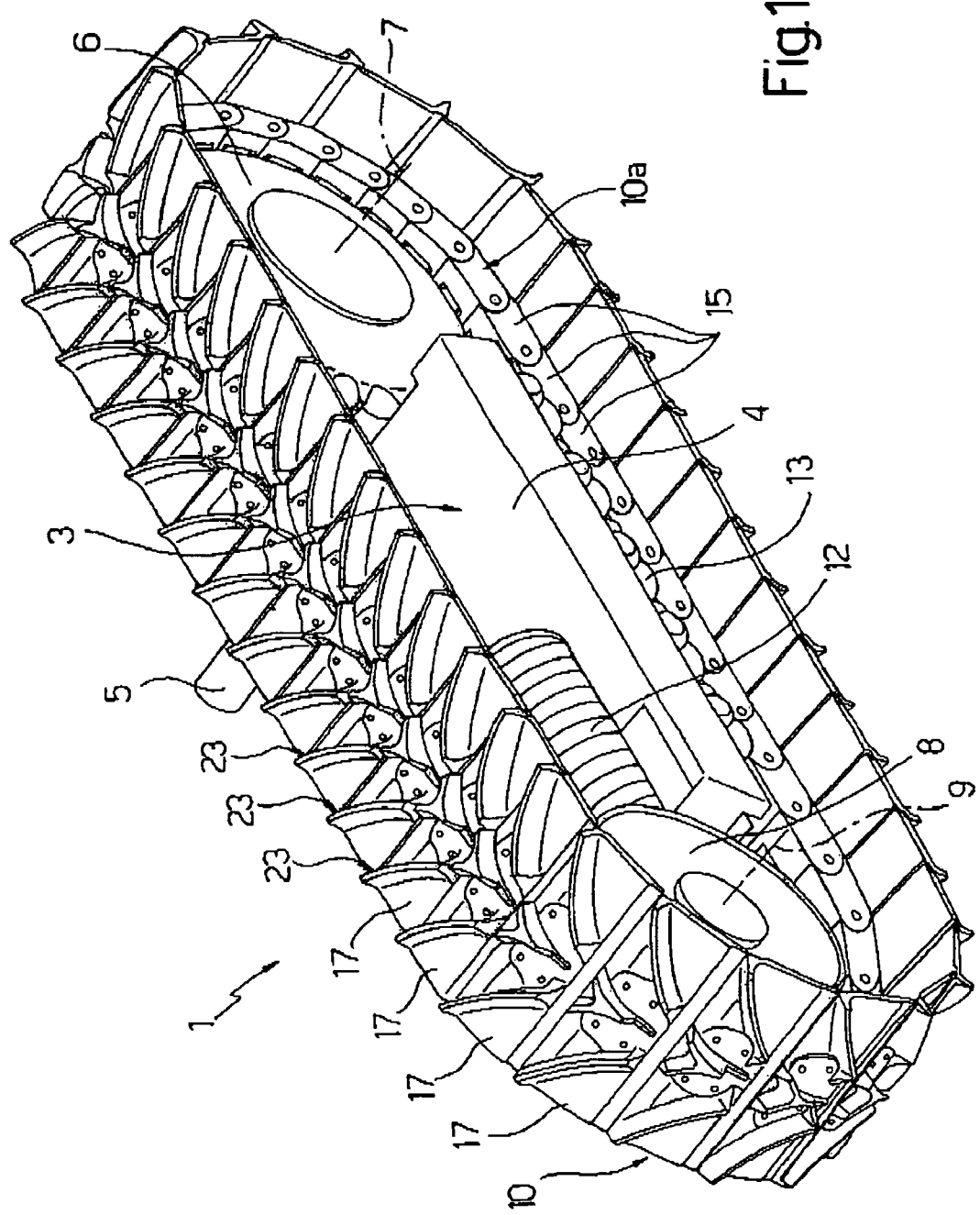
FIG. 1 is a perspective view of a crawler traction device featuring an embodiment of the metal track according to the present invention.

Traction device 1 comprises an undercarriage 3 in turn comprising a longitudinal beam 4 mounted for rotation on a cross member 5, which is integral with a frame (not shown) of vehicle 2 and connects longitudinal beam 4 to a like longitudinal beam of a further crawler traction device (not shown) of vehicle 2.

Traction device 1 also has a rear drive sprocket 6 fitted to the frame (not shown) of vehicle 2 to rotate, with respect to the frame, about an axis 7 parallel to cross member 5; a front idler wheel 8 fitted to undercarriage 3 to rotate, with respect to undercarriage 3, about an axis 9 parallel to axis 7; and a track 10, which is looped about drive sprocket 6 and idler wheel 8, meshes with drive sprocket 6, and is maintained taut by idler wheel 8, which, accordingly, is mounted to slide on undercarriage 3 by means of a known fork 11 connected to a known spring-operated track-tensioning device 12 not described in detail.

Figure 2:
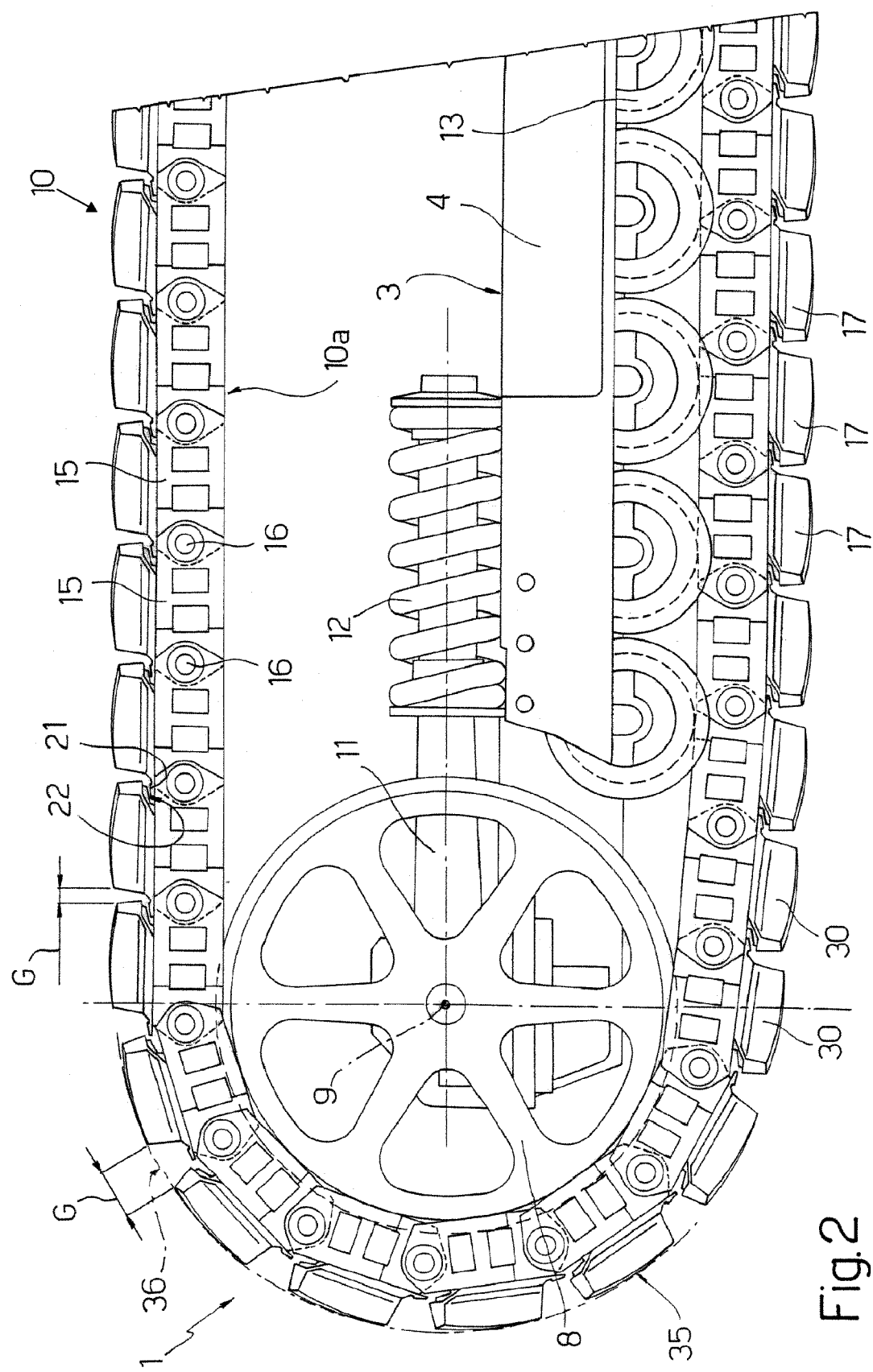
FIG. 2 shows a side detail view of the traction device of FIG. 1.

As shown in FIG. 2, between drive sprocket 6 and idler wheel 8, undercarriage 3 is fitted with a number of carrier rollers 13 arranged in pairs, each of which comprises an inner roller and an outer roller (only the outer roller shown in FIG. 2), which rotate about a respective axis parallel to axis 7, and are arranged with their respective peripheral surfaces contacting track 10 to distribute the weight of vehicle 2 evenly over the terrain.

Figure 3:
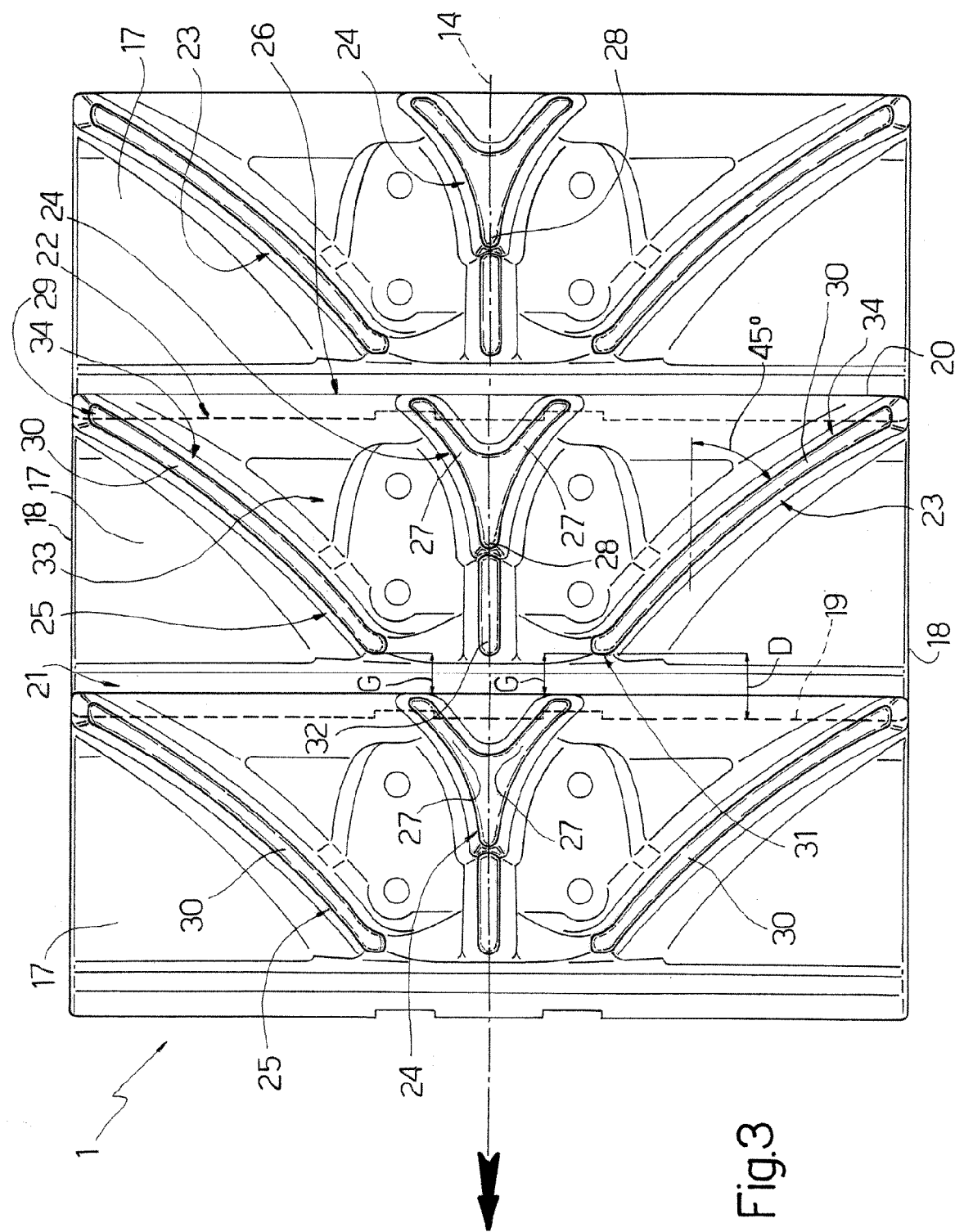
FIG. 3 shows a larger-scale plan detail view of the metal track in FIG. 1.

As shown in FIGS. 1, 2 and 3, track 10 has a longitudinal axis 14 crosswise to axis 7, and comprises a chain 10a of metal links 15, which are hinged to one another by pins 16 crosswise to longitudinal axis 14, and are fitted with respective metal shoes 17 defining as a whole the work surface of track 10.

As shown in more detail in FIG. 3, each shoe 17 comprises a substantially rectangular plate bounded by two lateral edges 18 parallel to and equidistant on opposite sides of longitudinal axis 14, and by two edges 19 and 20 perpendicular to axis 14 and lateral edges 18. More specifically, edge 19 precedes edge 20 in the forward travelling direction (shown by the arrow in FIG. 3) of vehicle 2.

Each shoe 17 comprises a recessed portion 21 along the whole of edge 19; and, at the opposite end, along the whole of edge 20, a projecting portion 22 at least partly overlapping the recessed portion 21 of the adjacent shoe 17.

As shown in FIG. 1, the respective work surfaces of shoes 17 have respective teeth, which together define, on track 10, a succession of arrow-shaped teeth 23 arranged along longitudinal axis 14 and oriented in the forward travelling direction of vehicle 2.

More specifically, as shown in detail in FIG. 3, each arrow-shaped tooth 23 extends over two adjacent shoes 17, each of which comprises a front portion 24 of one arrow-shaped tooth 23, and a rear portion 25 of another arrow-shaped tooth 23. Front portions 24 and rear portions 25 being complementary in shape, each front portion 24 of one shoe 17 cooperates with a rear portion 25 of the following adjacent shoe 17 to define, with rear portion 25, a complete arrow-shaped tooth 23.

Each front portion 24 defines the vertex portion of a respective arrow-shaped tooth 23, has a rear end 26 substantially at edge 20 of relative shoe 17, and comprises two ribs 27, which are specular with respect to longitudinal axis 14, converge from edge 20 towards longitudinal axis 14 and edge 19 of relative shoe 17, and intersect at a point along longitudinal axis 14 to form an apex 28 of relative arrow-shaped tooth 23.

Each rear portion 25 defines a base portion of a arrow-shaped tooth 23, has a rear end 29 substantially at edge 20, and comprises two ribs 30, which are specular with respect to longitudinal axis 14, converge from edge 20 towards longitudinal axis 14 and edge 19, and each extend inside the space between longitudinal axis 14 and a respective lateral edge 18.

Rear portion 25 has a front end 31 defined by the front ends of ribs 30 and located at a distance D, measured along longitudinal axis 14, from edge 19, and at a distance G, also measured along longitudinal axis 14, from the rear end of the complementary front portion 24 of the adjacent shoe 17.

Distance G therefore defines a gap between front portion 24 and rear portion 25 of each arrow-shaped tooth 23, and, as shoes 17 part as they rotate about drive sprocket 6 and idler wheel 8, varies in value, along track 10, between a minimum value—assumed along the straight portions of track 10, along which projecting portion 22 of each shoe 17 is in a position of maximum overlap with recessed portion 21 of the adjacent shoe 17—and a maximum value—assumed along the portions of track 10 winding about drive sprocket 6 and idler wheel 8, along which shoes 17 part, and projecting portion 22 of each shoe 17 is in a position of minimum overlap with recessed portion 21 of the adjacent shoe 17.

In an intermediate position between relative ribs 30, each shoe 17 has a rib 32, which is lower than relative ribs 27 and 30, extends, parallel to longitudinal axis 14, towards edge 19 from apex 28 defined by relative front portion 24, and terminates with a front end at distance D from edge 19.

Given the arrangement of ribs 27, 30, 32 on each shoe 17, each pair of adjacent complete arrow-shaped teeth 23 define a arrow-shaped channel 33 comprising two identical portions 34 specular with respect to longitudinal axis 14, and each extending along the work surface of three adjacent shoes 17.

As shown in FIG. 3, each rib 27, 30 is curved, with its convexity facing longitudinal axis 14, and defines, with its complementary rib 30, 27, a curve sloping at a decreasing angle, with respect to longitudinal axis 14, towards relative apex 28.

Since ribs 30 slope at a mean angle of about 45° with respect to longitudinal axis 14, while ribs 27 slope at a mean angle of about 30°, each portion 34 of each channel 33 therefore flares towards its open end.

Figure 4:
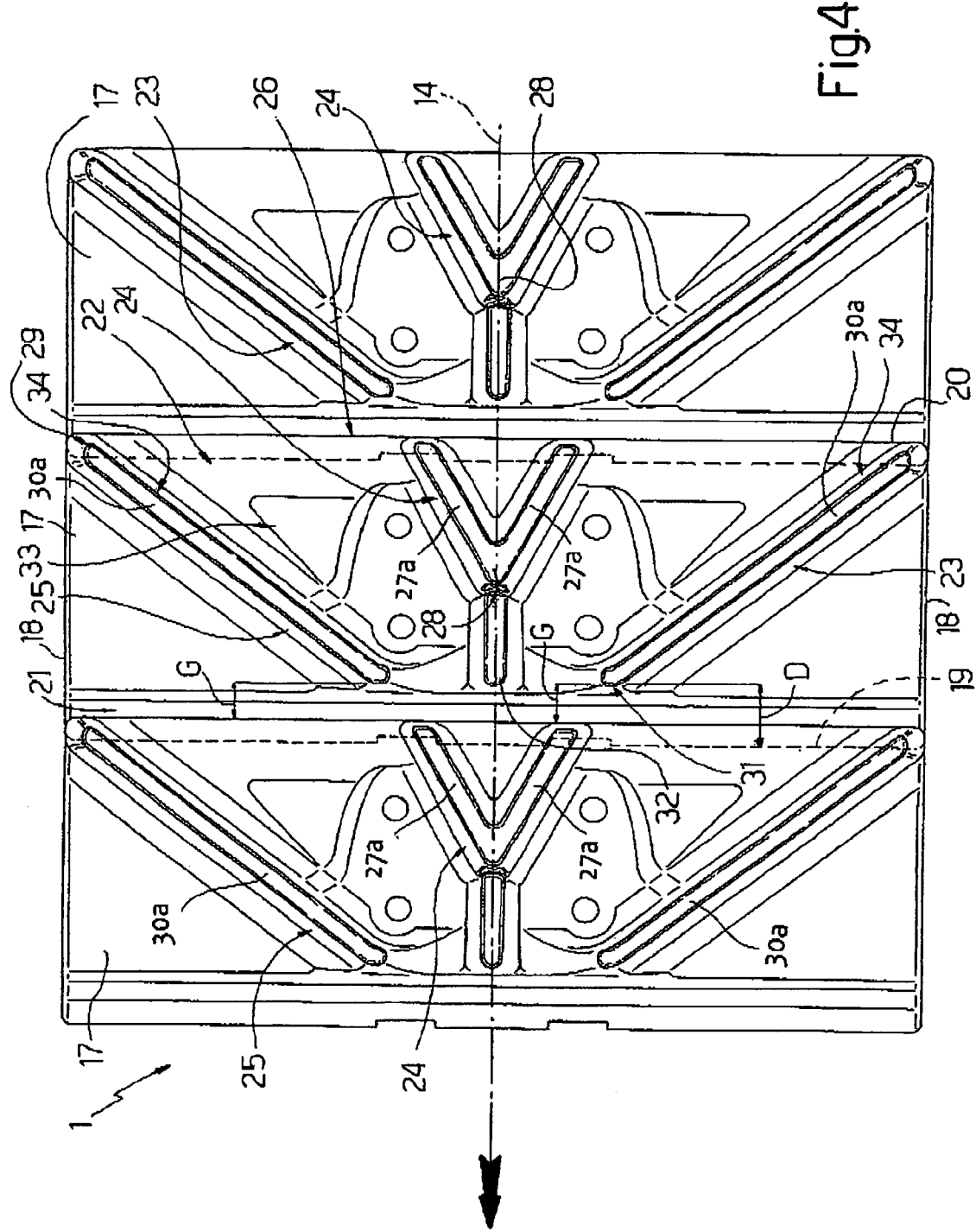
FIGS. 4 and 5 show respective variations to the FIG. 3 detail view.

In the FIG. 4 variation, ribs 27a and 30a are straight, but slope at different angles similar to the mean angles of the FIG. 3 curved ribs, so that each straight rib 27a defines, with its complementary straight rib 30, a broken line sloping, with respect to longitudinal axis 14, at a decreasing angle towards relative apex 28. In this case too, each pair of adjacent complete arrow-shaped teeth 23 define a arrow-shaped channel 33 comprising two identical portions 34 flaring towards their respective open ends.

Figure 5:
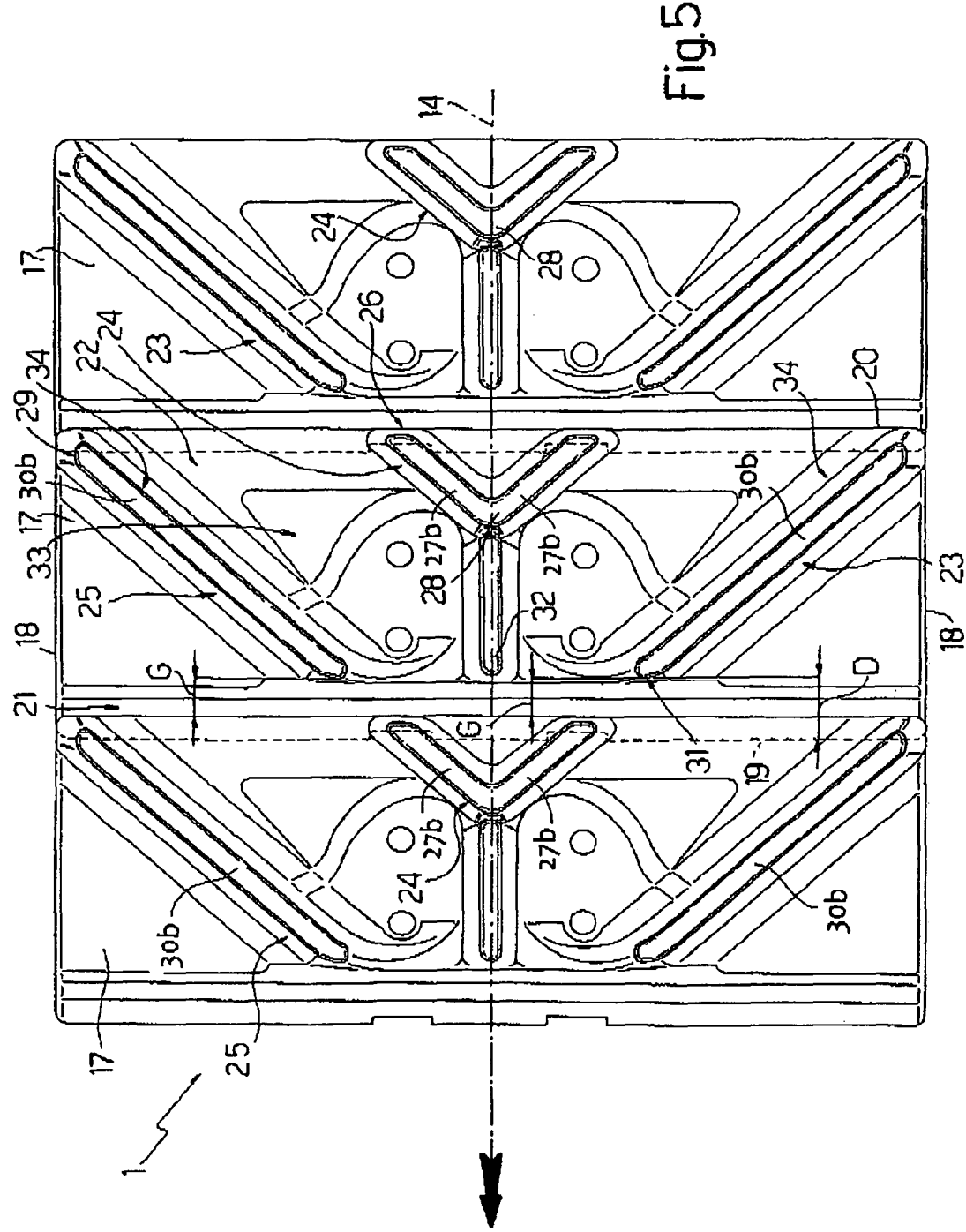

In the FIG. 5 variation, ribs 27b and 30b are straight, but slope at the same angle with respect to longitudinal axis 14, so that each pair of adjacent complete arrow-shaped teeth 23 define a arrow-shaped channel 33 comprising two identical portions 34 of constant cross section.

As shown in FIG. 2, ribs 27 and 30 have respective curved, outwardly-convex, free edges 35 of such a curvature that, when relative shoes 17 are located along the arc of track 10 about drive sprocket 6 or idler wheel 8, free edges 35 lie along the inner surface of the same cylinder or arc shape track profile 36 coaxial with axis 7 or 9 respectively (only the cylinder 36 coaxial with idler wheel 8 is shown in FIG. 2).

In a variation not shown, ribs 27 and 30 may have straight free edges 35.

Obviously, ribs 27 and 30 in the FIGS. 4 and 5 variations may also have curved or straight free edges 35.

In actual use, as stated, soil tends to pack inside channels 33 of the shoes 17 contacting the ground and defining as a whole the work branch of track 10.

Front portion 24 and rear portion 25 of each arrow-shaped tooth 23 being separated by distance G, material penetrates, not only inside channels 33, but also inside the gap between the front end of each rear portion 25 and the rear end 26 of the complementary front portion 24, so that, as opposed to a number of separate V-shaped clods, a single reticular clod, comprising a number of V-shaped clods connected by crosswise bridges, is formed on the work branch of track 10.

On reaching drive sprocket 6, shoes 17 begin rotating about axis 7, and rotate apart about respective pins 16. As a result of both the parting and change in position of the shoes, sufficient concentrated stresses are generated inside each V-shaped clod and in the areas between relative shoes 17 to guarantee fracture of the clod into three parts, i.e. as many parts as the number of shoes 17 over which the V-shaped clod extends.

Contrary to what might be expected, the crosswise bridges, which are not strictly necessary, do not impede, and in fact actually accelerate, clod detachment, by virtue of each detached V-shaped clod portion dislodging and accelerating detachment of the clod portion connected to it by a crosswise bridge.

The same break-up effect, as shoes 17 rotate about drive sprocket 6, obviously also applies as shoes 17 rotate about axis 9 of idler wheel 8, where any still-compacted clods are broken up and removed from track 10, and any fractured clods still lodged inside channels 33 are finally detached and expelled off shoes 17.

In connection with the above, it should be pointed out that break-up, as described above, is further enhanced by rib 32 inside each channel 33, which provides for axially weakening and promoting longitudinal fracture and expulsion, through the open ends of portions 34 of channel 33, of a clod lodged inside the channel.

Fractured clod expulsion from portions 34 is particularly effective in the FIG. 1-4 embodiment, in which the cross section of portions 34 increases outwards.

Another advantage of track 10 lies in greatly reducing vibration and, hence, noise as track 10 advances over the terrain.

That is, in addition to the known advantages of the "V" tooth design, the gap between front portion 24 and rear portion 25 of each arrow-shaped tooth 23 prevents clashing of the two tooth portions as the respective shoes 17 come together.

Finally, the noise level of track 10 is further reduced by the curved shape of free edges 35 of ribs 27 and 30, which provides for easing ribs 27 and 30 on and off the terrain.

What is claimed is:

1. A track for crawler vehicles, the track having a longitudinal axis, and comprising:
    a plurality of shoes, and an endless drive member connecting the shoes to one another so that a first and second edge, crosswise to the longitudinal axis, of each shoe are adjacent to the second and first edge, respectively, of respective adjacent shoes;
    each shoe having a work surface with arrow-shaped teeth, which comprise a front portion of one arrow-shaped tooth and a rear portion of another arrow-shaped tooth spaced apart on the work surface and complementary in shape;
    each portion of arrow-shaped tooth of each shoe cooperating with a relative complementary portion on a respective adjacent shoe to define a complete arrow-shaped tooth; and
    the complementary front and rear portions of each complete arrow-shaped tooth are located a first distance apart, measured along the longitudinal axis between a rear end of the front portion and a front forwardmost end of the rear portion of the adjacent shoe, to define a gap; wherein each front portion of each arrow-shaped tooth comprises two first ribs that intersect at a point along the longitudinal axis to form an apex facing the first edge; wherein on each shoe, a leading rib parallel to the longitudinal axis extends from the apex towards the first edge wherein the leading rib has a height extending from the shoe that is less than the height of the apex.

2. A track as claimed in claim 1, wherein the front and rear portions of each shoe are configured to form therein a clod comprising a number of V-shaped clods connected by crosswise bridges configured to be formed by the gaps between the portions.

3. A track as claimed in claim 1, wherein the chain comprises straight portions connected by curved portions; said first distance varying between a minimum value along said straight portions, and a maximum value along said curved portions distance, the first distance defining a length of the gap that extends laterally adjacent the second edge of the shoe between the front portion and rear portions of the adjacent shoes.

4. A track as claimed in claim 1, wherein the front and rear portions on each shoe have respective rear ends located substantially at the second edge along a line generally perpendicular to the longitudinal axis; the rear portion having the front forwardmost end located a given second distance from the first edge.

5. A track as claimed in claim 4, wherein said second distance is at least large as said first distance.

6. A track as claimed in claim 1, wherein the two first ribs are located on opposite sides of the longitudinal axis, are symmetrical with respect to the longitudinal axis, converge from respective end points towards the longitudinal axis and the first edge of the relative shoe, and
    wherein each rear portion of each arrow-shaped tooth comprises two second ribs, which are located on opposite sides of the longitudinal axis, are symmetrical with respect to the longitudinal axis, and converge towards the longitudinal axis and the first edge of the relative shoe.

7. A track as claimed in claim 6, wherein each second rib extends from a respective corner of the relative shoe across the working face of the shoe towards the longitudinal axis to a point laterally adjacent a rear end point of one of the first ribs; said corner being defined by the second edge and by a respective lateral edge of the shoe.

8. A track as claimed in claim 6, wherein the two first ribs on each shoe are located in the space between the two second ribs, at least one of the second ribs of each shoe extending over a greater width of the working face of the shoe, perpendicular to the longitudinal axis, than at least one of the first ribs.

9. A track as claimed in claim 6, wherein each second rib slopes at a mean angle of about 45° with respect to the longitudinal axis.

10. A track as claimed in claim 6, wherein said first and second ribs are straight ribs.

11. A track as claimed in claim 10, wherein said first and second ribs slope at the same angle with respect to the longitudinal axis.

12. A track as claimed in claim 10, wherein, on each shoe, the first rib and second rib on the same side of the longitudinal axis slope at different angles with respect to the longitudinal axis.

13. A track as claimed in claim 12, wherein the second rib slopes more steeply than the first rib.

14. A track as claimed in claim 13 wherein each first and second portion of each arrow-shaped channel have, crosswise to the longitudinal axis, respective widths decreasing towards the apexes of the respective complete arrow-shaped teeth.

15. A track as claimed in claim 6, wherein said first and second ribs are curved ribs.

16. A track as claimed in claim 15, wherein said first and second ribs are positioned with their convexities facing the longitudinal axis.

17. A track as claimed in claim 16, wherein each first rib and the complementary second rib of each arrow-shaped tooth define a curve sloping, with respect to the longitudinal axis, at a decreasing angle towards said apex.

18. A track as claimed in claim 17, wherein the free edges of the first and second ribs are positioned selectively, in use, along an inner surface of an arc shaped profile coaxial with the drive sprocket, and of an arc shaped profile coaxial with the idler wheel.

19. A track as claimed in claim 6, wherein each first and second rib have respective curved, outwardly-convex free edges along a around contacting surface.

20. A track as claimed in claim 19, wherein the curvatures of said free edges are configured such that the free edges are positioned selectively, in use, along an inner surface of at least one arch shaped profile.

21. A track as claimed in claim 20, wherein a pair of adjacent complete arrow-shaped teeth define an arrow-shaped channel extending along the work surface of three consecutive shoes, wherein each arrow-shaped channel defines a first and second portion.

22. A track as claimed in claim 1, wherein each pair of adjacent complete arrow-shaped teeth defines a arrow-shaped channel comprising a first and second portion, which are located on opposite sides of the longitudinal axis, and are specular with respect to the longitudinal axis.

23. A track as claimed in claim 1, wherein each shoe comprises a recessed portion extending along the first edge, ahead of a front end of the relative rear portion; and a projecting portion extending along the second edge and at least partly overlapping the recessed portion of the adjacent shoe, wherein a rear section of at least one of the front or rear portions of the arrow-shaped tooth extends over the projecting portion.

24. A track as claimed in claim 1, wherein the shoes are made of metal, and the endless drive member includes a metal chain to which each shoe is hinged.

25. A track as claimed in claim 1, in combination with the crawler, the crawler having a drive sprocket, an idler wheel, and the track looped about the drive sprocket and the idler wheel.

\* \* \* \* \*